March 22, 1955     F. HELEN-MARY SHIFFMAN     2,704,415
RUG STRETCHER
Filed Dec. 6, 1952
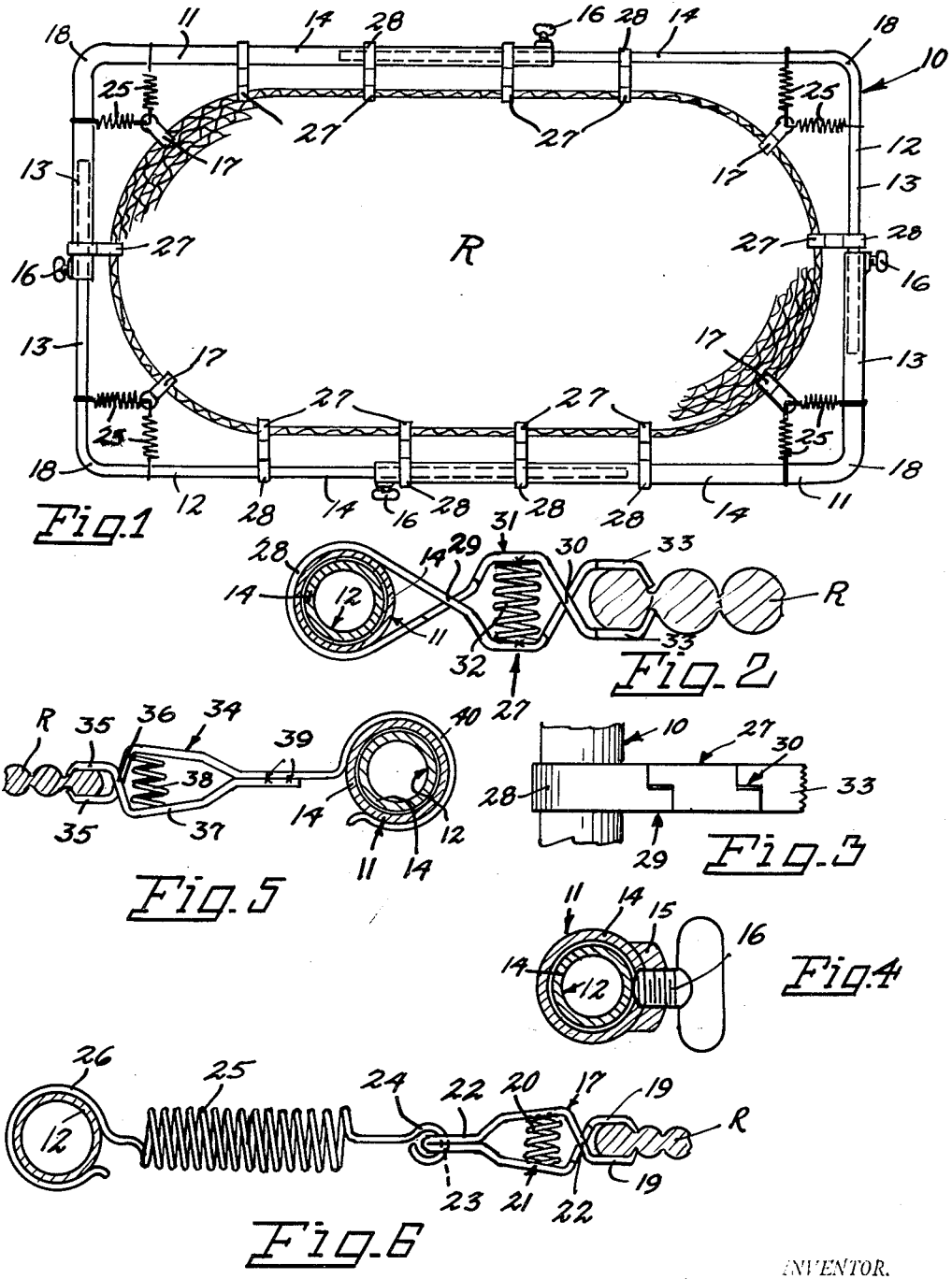
INVENTOR.
FRANCES H. M. SHIFFMAN
ATTORNEY

United States Patent Office 2,704,415
Patented Mar. 22, 1955

2,704,415

RUG STRETCHER

Frances Helen-Mary Shiffman, Spokane, Wash.

Application December 6, 1952, Serial No. 324,566

1 Claim. (Cl. 45—24)

My present invention is a rug stretcher of the type adapted to secure and stretch rugs of various sizes and marginal configurations.

One object of the invention lies in the provision of a rug stretcher which has an adjustable tubular frame adapted to encircle rugs of various shapes and sizes.

Another object of the invention lies in the provision of rug securing clips carried by a tubular frame and adapted to simultaneously clamp the marginal edges of a rug and be constricted about portions of the frame to prevent shifting of the clips.

Another object of the invention lies in the general improvement and construction for ease of manipulation in rug stretchers.

These and other objects of the invention will become apparent during the course of the following description.

In the accompanying drawings, forming a part of this specification, and in which like numerals are employed to designate like parts, Figure 1 is a plan view of a rug stretcher embodying my invention and clamping a rug of substantially oval shape therein;

Figure 2 is a fragmentary transverse cross section taken through a portion of the frame and a marginal edge of the rug and showing one of the improved clamps uniting the two;

Figure 3 is a fragmentary plan view of the frame and showing a clamp carried thereby;

Figure 4 is a transverse cross section of the locking means for securing the leg portions of the frame in relative selected positions;

Figure 5 is a view similar to Figure 2 and showing a modified clip; and

Figure 6 is a view similar to Figure 2 and showing a still further modified clip.

Referring now more particularly to the drawings, I have provided a rug stretcher which has a rectangular tubular frame 10 consisting of angular portions 11—11 and 12—12, each angular portion having legs disposed at right angle to each other, one leg being substantially shorter as indicated at 13 than the other 14. As shown in Figure 1, the portions 12 are of a diameter sufficiently small to permit the legs 13 and 14 to slide into the legs 13 and 14 of the portions 11, there being a close tolerance therebetween so that the legs will be axially aligned with the companion telescopic leg. At the free ends of the legs of portions 11, I have provided bosses 15 on the outer side faces of the frame portions, and a radially disposed hole is bored through the boss 15 and the side wall of the leg portions communicating with the interior thereof. The hole is threaded and a winged set bolt 16 is threadedly engaged through each boss 15 and adapted to bear against the legs of portions 12 to secure them in relative longitudinal telescopic adjustment.

As shown in Figure 1, with the shorter legs 13 associated and the longer legs 14 associated, a rectangular frame is formed. However, if it is desired to form a square frame in which a circular rug or a square rug may be stretched, each leg 13 is associated with a leg 14 of the opposed frame portions. By selective telescopic adjustments between the associated legs, the frame may be made any desired size within its physical limits.

For securing the oval-shaped rug R as indicated in Figure 1, clips 17 are provided at the corners 18 of the frame and are formed with opposed jaws 19—19 which are urged toward each other by means of an expansion spring 20 supported in a spring housing 21 defined by rearwardly extending portions of the clip body. As shown in Figure 6, the body is provided with a flattened tongue 22 having an aperture 23 therein at its rear end formed by folding the strip longitudinally midway its length and thence spreading the strip portions to form the housing 21. Forwardly of the housing the strip portions are cut away or narrowed by shaping so that they may cross or intersect as at 22 and thence terminate in the opposed jaws 19. It will thus be seen that expansion of spring 20 will bias jaws 19 toward each other where they may clamp rug R about its edge portions. The aperture 23 receives the hooked end 24 of springs 25 which are secured at their opposite ends adjacent the corners 18 and at opposed sides of the corner, thus disposing the springs at right angle to each other and permitting the clip 17 to exert outward pull at a 45° angle relative to the frame legs.

The springs 25 are secured to the frame by means of a constricting resilient hook 26 and may, therefore, be shifted along the frame as desired and yet will remain where positioned by reason of the resiliency in the hook. Other clips 27 are carried by the frame and inspection of Figure 2 will reveal that the clip is formed by folding a strip longitudinally midway its length to form a loop 28. The portions of the strip are then reduced in size at an intersection as at 29 as by cutting away one-half of the confronting edge portions or by bending and shaping the strip, and a second intersection as at 30 is formed in like manner. Between the intersections a spring housing 31 is disposed and contains an expansion spring 32. Forwardly of the intersection 30 the strips are formed at their terminal end portions with jaws 33.

Inspection of Figure 2 will reveal that the expansion spring 32 will bias the clip 27 so as to clamp jaws 33 about the edge of rug R and simultaneously restrict loop 28 to grip about the frame 10. By placing the thumb and forefinger above and below the spring housing 31, pressure may be applied which will spread the jaws 33 and open loop 28, thus releasing the rug from the clip and freeing the clip for longitudinal movement of the frame 10.

A modified form of rug clip 34 is shown in Figure 5 and comprises a pair of spaced jaws 35 which are defined at their rear side by an intersection previously described as at 36, and rearwardly of the intersection 36 is a spring housing 37 containing an expansion spring 38. The upper strip of the clip 34 is of a greater length than the lower strip and the lower strip is welded at 39 to the upper strip which continues to form a spring biased hook 40 similar to the hook 26 described earlier. This hook prevents accidental movement of the clip 34 along the frame and yet securely anchors the clip 34 for grasping rug R.

Having thus described my invention, I claim:

In a rug stretcher having an adjustable tubular frame, a clip formed from a strip of stiff metal and having a loop midway its length, an intersection of said strip defining said loop, a second intersection of said strip spaced from the first intersection and defining with the first intersection a spring housing, said strip being reduced in thickness at the points of intersection, terminal portions of said strip being shaped to form opposed jaws, and an expansion spring in said housing biased against opposed portions of said strip whereby the jaws are urged toward each other and the loop is constricted.

References Cited in the file of this patent

UNITED STATES PATENTS

| 1,042,342 | Hearn | Oct. 22, 1912 |
| 1,176,586 | Megahan | Mar. 21, 1916 |
| 1,521,903 | Mueller | Jan. 6, 1925 |